(12) United States Patent
Murakami et al.

(10) Patent No.: US 11,305,763 B2
(45) Date of Patent: Apr. 19, 2022

(54) VEHICLE MOVING CONTROL APPARATUS

(71) Applicant: Toyota Jidosha Kabushiki Kaisha, Toyota (JP)

(72) Inventors: Ryota Murakami, Toyota (JP); Yuma Hoshikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 89 days.

(21) Appl. No.: 16/856,411

(22) Filed: Apr. 23, 2020

(65) Prior Publication Data

US 2020/0339111 A1    Oct. 29, 2020

(30) Foreign Application Priority Data

Apr. 24, 2019    (JP) .............................. JP2019-082482

(51) Int. Cl.
*B60W 10/04* (2006.01)
*B60W 10/20* (2006.01)
(Continued)

(52) U.S. Cl.
CPC ............ *B60W 30/09* (2013.01); *B60W 10/04* (2013.01); *B60W 10/20* (2013.01);
(Continued)

(58) Field of Classification Search
CPC ...... B60W 10/04; B60W 10/18; B60W 10/20; B60W 30/09; B60W 30/0956; B60W 30/143; B60W 30/16; B60W 30/165; B60W 40/04; B60W 2420/42; B60W 2420/52; B60W 2520/105; B60W 2554/20; B60W 2554/4042; B60W 2554/802; B60W 2720/106
See application file for complete search history.

(56) References Cited

U.S. PATENT DOCUMENTS 6,708,099 B2 * 3/2004 Tellis ................. B60K 31/0008
180/167
2004/0181339 A1    9/2004 Mukaiyama
(Continued)

FOREIGN PATENT DOCUMENTS

JP    2004-276732 A    10/2004

*Primary Examiner* — Anshul Sood
(74) *Attorney, Agent, or Firm* — Dinsmore & Shohl LLP

(57) ABSTRACT

The vehicle moving control apparatus executes a following moving control to execute a target acceleration setting process and a following acceleration/deceleration process. The vehicle moving control apparatus corrects a target acceleration set by the target acceleration setting process to increase when the following moving control is executed, the target acceleration larger than zero is set by the target acceleration setting process, and an acceleration of an own vehicle is smaller than a predetermined threshold. The vehicle moving control apparatus stops the following acceleration/deceleration process and starts the steering avoidance control when a steering avoidance condition becomes satisfied as the following moving control is executed. The vehicle moving control apparatus limits the target acceleration to a value smaller than or equal to a predetermined acceleration when the steering avoidance control is stopped, and the following acceleration/deceleration process is restarted.

13 Claims, 10 Drawing Sheets

(51) Int. Cl.
  *B60W 30/09* (2012.01)
  *B60W 30/095* (2012.01)
  *B60W 30/16* (2020.01)
  *B60W 40/04* (2006.01)

(52) U.S. Cl.
  CPC ........ *B60W 30/0956* (2013.01); *B60W 30/16* (2013.01); *B60W 40/04* (2013.01); *B60W 2420/42* (2013.01); *B60W 2420/52* (2013.01); *B60W 2520/105* (2013.01); *B60W 2554/20* (2020.02); *B60W 2554/4042* (2020.02); *B60W 2554/802* (2020.02); *B60W 2720/106* (2013.01)

(56) References Cited

U.S. PATENT DOCUMENTS

| | | | |
|---|---|---|---|
| 2010/0121549 A1* | 5/2010 | Fukuda | B60W 30/188 701/93 |
| 2018/0065627 A1* | 3/2018 | Ohmura | B60W 30/14 |
| 2020/0010085 A1* | 1/2020 | Ohmura | B60W 30/143 |
| 2020/0094829 A1* | 3/2020 | Ohmura | B60W 40/04 |

* cited by examiner

VEHICLE MOVING CONTROL APPARATUS

CROSS-REFERENCE TO RELATED APPLICATIONS

This application claims priority to Japanese patent application No. JP 2019-082482 filed on Apr. 24, 2019, the content of which is hereby incorporated by reference in its entirety.

BACKGROUND

Field

The present disclosure relates to a vehicle moving control apparatus.

Description of the Related Art

There is known a vehicle moving control apparatus for controlling a moving of an own vehicle, using information on other vehicles and walking persons ahead of the own vehicle. The vehicle moving control apparatus has an information acquisition apparatus such as radar sensors and camera apparatuses for acquiring the information on the other vehicles and the walking persons ahead of the own vehicle.

One of the known vehicle moving control apparatuses executes a following moving control to control a driving torque applied to the own vehicle to accelerate or deceleration the own vehicle to maintain an inter-vehicle distance at a target distance. The inter-vehicle distance is a distance between the own vehicle and a forward-moving vehicle. The forward-moving vehicle is a vehicle moving just ahead of the own vehicle. This type of the known vehicle moving control apparatus executes the following moving control to control the driving torque to accelerate or decelerate the own vehicle to maintain a moving speed of the own vehicle at a target moving speed when the forward-moving vehicle does not exist.

Further, there is also known a vehicle moving control apparatus which executes a steering avoidance control to steer the own vehicle to pass by the walking person, avoiding the own vehicle from contacting to the walking person when the walking person exists ahead of the own vehicle.

Furthermore, there is also known a vehicle moving control apparatus which stops the following moving control when (i) the own vehicle is moving into an intersection, (ii) another vehicle is moving into the same intersection from a right or left side of the own vehicle, and (iii) a contact potential of the own vehicle contacting to the other vehicle is relatively high as the vehicle moving control apparatus executes the following moving control (for example, see JP 2004-276732 A). This vehicle moving control apparatus restarts the following moving control when the contact potential becomes relatively low.

There is also known a vehicle moving control apparatus which sets a target of an acceleration of the own vehicle as a target acceleration to accelerate the own vehicle as the vehicle moving control apparatus executes the following moving control. This vehicle moving control apparatus sets the target acceleration to a larger value when the acceleration of the own vehicle is small even after the vehicle moving control apparatus increases the driving torque to accomplish the target acceleration. If this vehicle moving control apparatus is configured (i) to stop the following moving control at a time of starting the steering avoidance control, (ii) to restart the following moving control at a time of finishing the steering avoidance control, (iii) to set the target acceleration after the vehicle moving control apparatus stops the following moving control, and (iv) to control the driving torque to accomplish the target acceleration at a time of restarting the following moving control, some problems may occur as described below.

When (i) the steering avoidance control is started, and the own vehicle is steered by the steering avoidance control to avoid the own vehicle from contacting to the walking person, the information acquisition apparatus of the own vehicle may not acquire information on the forward-moving vehicle temporarily. When the moving speed of the own vehicle is lower than the target moving speed as the information acquisition apparatus does not acquire the information on the forward-moving vehicle, the target acceleration which accelerates the own vehicle is set by the following moving control. When the steering avoidance control is executed, the following moving control is not executed. Thus, the driving torque is not increased even when the target acceleration which accelerates the own vehicle is set. As a result, the target acceleration is further increased since the acceleration of the own vehicle is small. Therefore, the target acceleration increases gradually as the following moving control is not executed. If the vehicle moving control apparatus is configured to increase the driving torque to accomplish the target acceleration set to the large value when the vehicle control apparatus restarts the following moving control, the own vehicle accelerates considerably.

SUMMARY

An object of the present disclosure is to provide the vehicle moving control apparatus which can prevent the own vehicle from accelerating considerably when the vehicle moving control apparatus restarts the following moving control after the vehicle moving control apparatus stops the following moving control in response to starting the steering avoidance control.

A vehicle moving control apparatus according to the present disclosure comprises an information acquisition apparatus and an electronic control unit. The information acquisition apparatus acquires information on situations ahead of an own vehicle as forward situation information. The electronic control unit controls an acceleration of the own vehicle, a deceleration of the own vehicle, and a steering of the own vehicle.

When (i) a following moving control is requested to be executed, and (ii) the electronic control unit determines that another vehicle exists ahead of the own vehicle, based on the forward situation information, the electronic control unit executes (i) a first target acceleration setting process of the following moving control to set a first target acceleration of the own vehicle necessary to maintain an inter-vehicle distance between the own vehicle and the other vehicle at a target distance and (ii) a first following acceleration/deceleration process of the following moving control to control a driving torque to be applied to the own vehicle to accelerate or decelerate the own vehicle to control an acceleration of the own vehicle to the first target acceleration.

When (i) the following moving control is requested to be executed, and (ii) the electronic control unit determines that the other vehicle does not exist ahead of the own vehicle, based on the forward situation information, the electronic control unit executes (i) a second target acceleration setting process of the following moving control to set a second target acceleration of the own vehicle necessary to maintain a moving speed of the own vehicle at a target moving speed, and (ii) a second following acceleration/deceleration process of the following moving control to control the driving torque to accelerate or decelerate the own vehicle to control the acceleration of the own vehicle to the second target acceleration.

When (i) the electronic control unit executes the second following acceleration/deceleration process to control the acceleration of the own vehicle to the second target acceleration larger than zero, and (ii) the acceleration of the own vehicle is smaller than a predetermined threshold, the electronic control unit increases the second target acceleration.

When the electronic control unit determines that a standing object to which the own vehicle potentially contacts, exists ahead of the own vehicle, based on the forward situation information, the electronic control unit executes a steering avoidance control to steer the own vehicle to cause the own vehicle to pass by the standing object, avoiding the own vehicle from contacting to the standing object.

The electronic control unit is configured to stop the second following acceleration/deceleration process when the electronic control unit starts to execute the steering avoidance control. Further, the electronic control unit is configured to limit the second target acceleration such that the second target acceleration is smaller than or equal to a predetermined acceleration when the electronic control unit finishes executing the steering avoidance control.

In the vehicle moving control apparatus according to the present disclosure, the second target acceleration is increased when (i) the electronic control unit executes the second following acceleration/deceleration process to control the acceleration of the own vehicle to the second target acceleration larger than zero, and (ii) the acceleration of the own vehicle is smaller than a predetermined threshold. Further, when the steering avoidance control is started, the second following acceleration/deceleration process is stopped. Furthermore, when the steering avoidance control is finished, the second target acceleration is limited to a value smaller than or equal to the predetermined acceleration.

When the own vehicle is steered by the steering avoidance control to pass by the standing object, avoiding the own vehicle from contacting to the standing object, the other vehicle may not exist ahead of the own vehicle temporarily. As a result, the vehicle moving control apparatus may determine that the other vehicle does not exist ahead of the own vehicle. In this case, if (i) the second target acceleration setting process is executed, and (ii) the moving speed of the own vehicle is smaller than the target moving speed, the second target acceleration larger than zero is set. However, the vehicle moving control apparatus does not execute the second following acceleration/deceleration process as the vehicle moving control apparatus executes the steering avoidance control. Thus, the moving speed of the own vehicle does not increase. In this case, the acceleration of the own vehicle is small even when the target acceleration larger than zero is set. Therefore, the second target acceleration increases continuously as the steering avoidance control is executed.

Thus, the excessive large second target acceleration may have been set when the steering avoidance control is finished. If the second following acceleration/deceleration process is restarted when the steering avoidance control is finished, the driving torque is controlled to control the acceleration of the own vehicle to the excessive large second target acceleration. Thereby, the driving torque is increased considerably In the vehicle moving control apparatus according to the present disclosure, the second target acceleration is limited to the value smaller than or equal to the predetermined acceleration when the steering avoidance control is finished. Thus, the own vehicle can be prevented from accelerating considerably if the second following acceleration/deceleration process is restarted when the steering avoidance control is finished.

According to an aspect of the present disclosure, the electronic control unit may be further configured to stop executing the following moving control when the electronic control unit starts to execute the steering avoidance control.

In the vehicle moving control apparatus according to this aspect, the following moving control is stopped when the steering avoidance control is started. Thus, the second target acceleration is not set as the steering avoidance control is executed. Therefore, the own vehicle can be prevented from accelerating considerably if the second following acceleration/deceleration process is restarted when the steering avoidance control is finished.

According to another aspect of the present disclosure, the electronic control unit may be further configured not to execute the following moving control even when the following moving control is requested to be executed as the electronic control unit executes the steering avoidance control.

In the vehicle moving control apparatus according to this aspect, the following moving control is not executed even when the following moving control is requested to be executed as the steering avoidance control is executed. Thus, the second target acceleration is not set as the steering avoidance control is executed. Therefore, the own vehicle can be prevented from accelerating considerably if the second following acceleration/deceleration process is restarted when the steering avoidance control is finished.

According to further another aspect of the present disclosure, the electronic control unit may be further configured to stop executing the second target acceleration setting process and set the second target acceleration to zero when the electronic control unit starts to execute the steering avoidance control.

In the vehicle moving control apparatus according to this aspect, the second target acceleration setting process is stopped, and the second target acceleration is set to zero when the steering avoidance control is started. Thus, the second target acceleration is zero when the steering avoidance control is executed. Therefore, the own vehicle can be prevented from accelerating considerably if the second following acceleration/deceleration process is restarted when the steering avoidance control is finished.

According to further another aspect of the present disclosure, the electronic control unit may be further configured to restart to execute the second following acceleration/deceleration process and the second target acceleration setting process when the electronic control unit finishes executing the steering avoidance control after the electronic control unit stops executing the second following acceleration/deceleration process and the second target acceleration setting process in response to starting to the steering avoidance control.

According to further another aspect of the present disclosure, the electronic control unit may be further configured to limit the second target acceleration to an upper limit acceleration when the second target acceleration set by the second target acceleration setting process is larger than the upper limit acceleration as the electronic control unit executes the steering avoidance control after the electronic control unit stops executing the second following acceleration/deceleration process in response to starting to execute the steering avoidance control, the upper limit acceleration being smaller than and equal to the predetermined acceleration and larger than zero.

In the vehicle moving control apparatus according to this aspect, the second target acceleration is limited to the upper limit acceleration when the steering avoidance control is executed. Thus, the second target acceleration is smaller than and equal to the upper limit acceleration when the steering avoidance control is finished. Therefore, the own vehicle can be prevented from accelerating considerably if the second following acceleration/deceleration process is restarted when the steering avoidance control is finished.

According to further another aspect of the present disclosure, the electronic control unit may be further configured to restart to execute the second following acceleration/deceleration process when the electronic control unit finishes executing the steering avoidance control after the electronic control unit stops executing the second following acceleration/deceleration process in response to starting to execute the steering avoidance control.

According to further another aspect of the present disclosure, the electronic control unit may be further configured to gradually increase the second target acceleration as the acceleration of the own vehicle is smaller than the predetermined threshold when (i) the electronic control unit executes the second following acceleration/deceleration process to control the acceleration of the own vehicle to the second target acceleration larger than zero, and (ii) the acceleration of the own vehicle is smaller than the predetermined threshold.

According to further another aspect of the present disclosure, the electronic control unit may be further configured to set the first target acceleration, based on a difference between the inter-vehicle distance and the target distance.

According to further another aspect of the present disclosure, the electronic control unit may be further configured to set the second target acceleration, based on a difference between the moving speed of the own vehicle and the target moving speed.

The information acquisition apparatus may include at least one of a radar sensor and a camera apparatus.

The electronic control unit may be further configured to control operations of a driving torque generation apparatus to control the acceleration of the own vehicle and the deceleration of the own vehicle.

The electronic control unit may be further configured to control operations of a steering apparatus to control the steering of the own vehicle.

Elements of the present disclosure are not limited to elements of embodiments and modified examples of the present disclosure described along with the drawings. The other objects, features and accompanied advantages of the present disclosure can be easily understood from the embodiments and the modified examples of the present disclosure.

DESCRIPTION OF THE EMBODIMENTS

Figure 1:
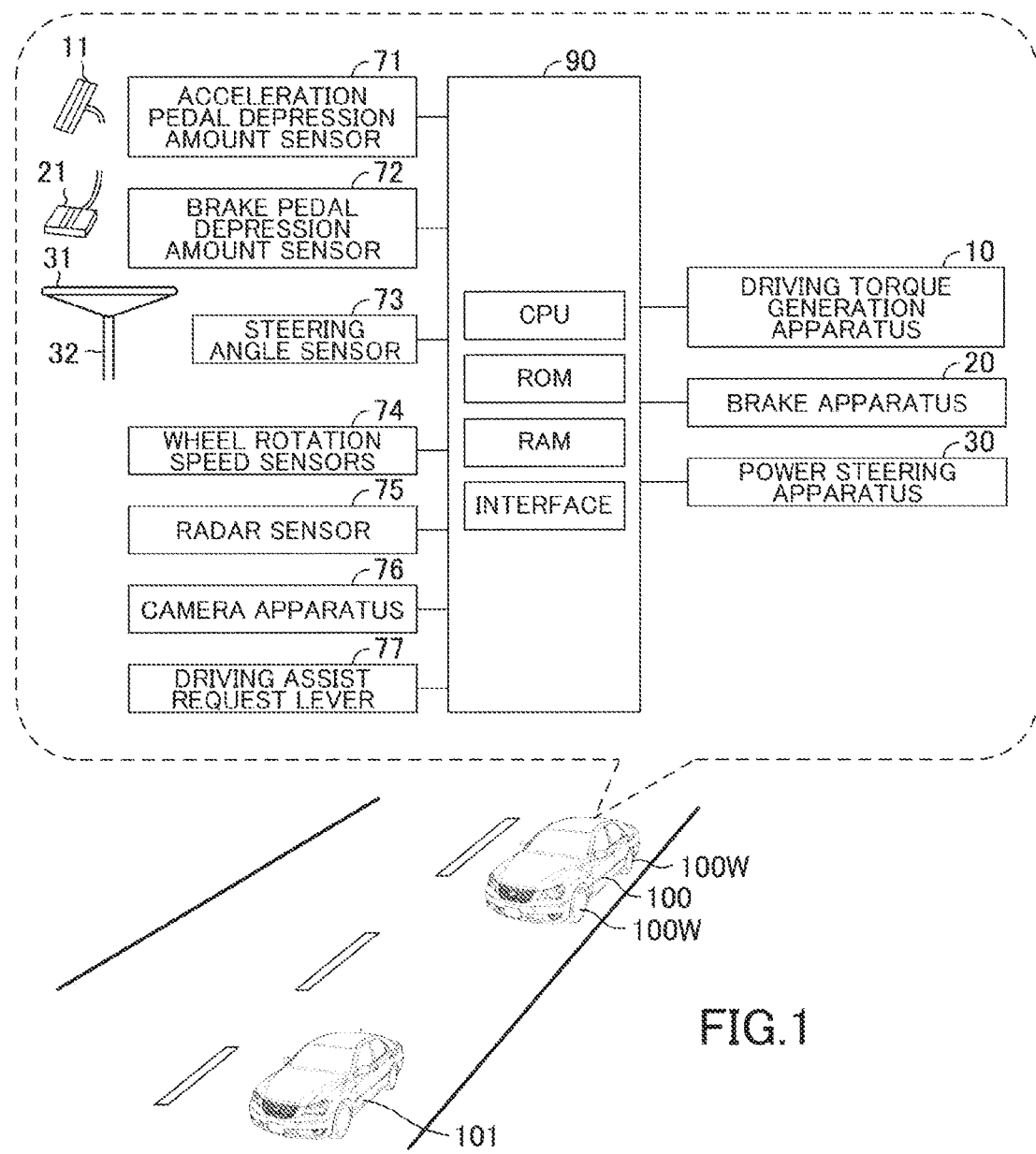
FIG. 1 is a view which shows a vehicle moving control apparatus according to an embodiment of the present disclosure and a vehicle to which the vehicle moving control apparatus is applied.

Below, a vehicle moving control apparatus according to an embodiment of the present disclosure will be described with reference to the drawings. Hereinafter, the vehicle moving control apparatus according to the embodiment of the present disclosure will be referred to as "the embodiment control apparatus." As shown in FIG. 1, the embodiment control apparatus is applied to an own vehicle 100. The embodiment control apparatus includes an ECU 90. ECU stands for "Electronic Control Unit." The ECU 90 includes a microcomputer as a main component. The microcomputer includes a CPU, a ROM, a RAM, a non-volatile memory, and an interface. The CPU is configured to realize various functions by executing instructions, programs, and routines memorized in the ROM.

<Driving Torque Generation Apparatus>

As shown in FIG. 1, the own vehicle 100 is installed with a driving torque generation apparatus 10. The driving torque generation apparatus 10 includes an internal combustion engine (not shown), at least one motor generator (not shown), a battery (not shown), and an inverter (not shown). The internal combustion engine includes fuel injectors.

The driving torque generation apparatus 10 is electrically connected to the ECU 90. In particular, the fuel injectors of the driving torque generation apparatus 10 and the inverter are electrically connected to the ECU 90. The ECU 90 can control torques output from the internal combustion engine by controlling operations of the fuel injectors. The ECU 90 can control torques output from the at least one motor generator by controlling operations of the inverter to control electric power amount supplied to the at least one motor generator. That is, the ECU 90 can control the torque output from the driving torque generation apparatus 10 by controlling operations of the driving torque generation apparatus 10. Hereinafter, the torque output from the driving torque generation apparatus 10 will be referred to as "the driving torque TQout."

The driving torque TQout is transmitted to left and right front wheels 100W of the own vehicle 100 via a drive shaft (not shown). The own vehicle 100 is driven by the driving torque TQout transmitted to the left and right front wheels 100W.

The own vehicle 100 to which the embodiment control apparatus is applied, is a so-called hybrid vehicle. The own vehicle 100 may be a vehicle installed with the internal combustion engine only as the driving torque generation apparatus 10. Alternatively, the own vehicle 100 may be a so-called plug-in hybrid vehicle installed with (i) the internal combustion engine and the at least one motor generator as the driving torque generation apparatus 10 and (ii) a battery which can be charged by an outside electric power source. Alternatively, the own vehicle 100 may be a so-called electric vehicle installed with (i) the at least one motor generator only as the driving torque generation apparatus 10 and (ii) a battery which can be charged by an outside electric power source. Alternatively, the own vehicle 100 may be a so-called fuel cell vehicle installed with the at least one motor generator as the driving torque generation apparatus 10 and which uses electric power generated by a fuel cell as electric power to operate the at least one motor generator.

<Brake Apparatus>

The own vehicle 100 is installed with a brake apparatus 20. The brake apparatus 20 can apply braking forces BK to left and right rear wheels 100W and the left and right front wheels 100W of the own vehicle 100, respectively. The brake apparatus 20 is electrically connected to the ECU 90. The ECU 90 can control the braking forces BK applied to the wheels 100W by controlling operations of the brake apparatus 20.

<Power Steering Apparatus>

The own vehicle 100 is installed with a power steering apparatus 30. The power steering apparatus 30 can steers the front wheels 100W of the own vehicle 100. The power steering apparatus 30 is electrically connected to the ECU 90. The ECU 90 can control steering angles of the front wheels 100W by controlling operations of the power steering apparatus 30. Hereinafter, the steering angles of the front wheels 100W will be collectively referred to as "the front wheel steering angle AGst."

<Other Components>

As shown in FIG. 1, the own vehicle 100 is installed with an acceleration pedal 11, a brake pedal 21, an acceleration pedal depression amount sensor 71, a brake pedal depression amount sensor 72, a steering angle sensor 73, vehicle wheel rotation speed sensors 74, a radar sensor 75, a camera apparatus 76, and a driving assist request lever 77.

The acceleration pedal depression amount sensor 71 is electrically connected to the ECU 90. The acceleration pedal depression amount sensor 71 detects an amount of depression applied to the acceleration pedal 11 by a driver of the own vehicle 100. The acceleration pedal depression amount sensor 71 sends signals representing the detected amounts to the ECU 90. The ECU 90 acquires the amount of the depression applied to the acceleration pedal 11, based on the signal sent from the acceleration pedal depression amount sensor 71. Hereinafter, the amount of the depression applied to the acceleration pedal 11 will be referred to as "the acceleration pedal depression amount AP."

The brake pedal depression amount sensor 72 is electrically connected to the ECU 90. The brake pedal depression amount sensor 72 detects amounts of depression applied to the brake pedal 21 by the driver of the own vehicle 100. The brake pedal depression amount sensor 72 sends signals representing the detected amounts to the ECU 90. The ECU 90 acquires the amount of the depression applied to the brake pedal 21, based on the signal sent from the brake pedal depression amount sensor 72. Hereinafter, the amount of the depression applied to the brake pedal 21 will be referred to as "the brake pedal depression amount BP."

The steering angle sensor 73 is electrically connected to the ECU 90. The steering angle sensor 73 detects angles of rotation of a steering shaft 32 by the driver of the own vehicle 100 rotating a steering wheel 31. The steering angle sensor 73 sends signals representing the detected angles to the ECU 90. The ECU 90 acquires the angle of the rotation of the steering shaft 32 by the driver of the own vehicle 100 rotating the steering wheel 31, based on the signal sent from the steering angle sensor 73. Hereinafter, the angle of the rotation of the steering shaft 32 will be referred to as "the steering angle AGdriver." In addition, the ECU 90 acquires an angle requested as the front wheel steering angle AGst, based on the acquired steering angle AGdriver. Hereinafter, the angle requested as the front wheel steering angle AGst will be referred to as "the requested steering angle AGst_req."

The vehicle wheel rotation speed sensors 74 are electrically connected to the ECU 90. The vehicle wheel rotation speed sensors 74 detect speeds of rotation of the wheels 100W of the own vehicle 100, respectively. The vehicle wheel rotation speed sensors 74 send signals representing the detected speeds to the ECU 90. The ECU 90 acquires the speeds of the rotation of the wheels 100W of the own vehicle 100, based on the signals sent from the vehicle wheel rotation speed sensors 74. The speeds of the rotation of the wheels 100W of the own vehicle 100 will be referred to as "the vehicle wheel rotation speeds V1 to V4", respectively. In addition, the ECU 90 acquires an average Vave of the acquired vehicle wheel rotation speeds V1 to V4 as a moving speed of the own vehicle 100 (Vave=(V1+V2+V3+V4)/4). Hereinafter, the moving speed of the own vehicle 100 will be referred to as "the moving speed SPD."

The radar sensor 75 is mounted on the own vehicle 100 to output millimeter waves ahead of the own vehicle 100. The radar sensor 75 is electrically connected to the ECU 90. The radar sensor 75 outputs the millimeter waves ahead of the own vehicle 100. When an object exists ahead of the own vehicle 100, the millimeter waves output from the radar sensor 75 are reflected by the object. The radar sensor 75 receives the millimeter waves reflected by the object. The radar sensor 75 sends (i) data on the millimeter waves output from the radar sensor 75 and (ii) data on the millimeter waves received by the radar sensor 75 to the ECU 90. Hereinafter, the data on the millimeter waves output from the radar sensor 75 will be referred to as "the millimeter wave data", and the data on the millimeter waves received by the radar sensor 75 will be also referred to as "the millimeter wave data." As can be understood, the radar sensor 75 is one of information acquisition apparatuses which acquire information on situations ahead of the own vehicle 100 as forward situation information (i.e., the millimeter wave data).

The camera apparatus 76 is mounted on the own vehicle 100 to take images of a view ahead of the own vehicle 100. The camera apparatus 76 is electrically connected to the ECU 90. The camera apparatus 76 sends data on the taken images of the view to the ECU 90. Hereinafter, the data on the taken images of the view will be referred to as "the image data." As can be understood, the camera apparatus 76 is one of the information acquisition apparatuses which acquire the information on the situations ahead of the own vehicle 100 as the forward situation information (i.e., the image data).

Figure 2:
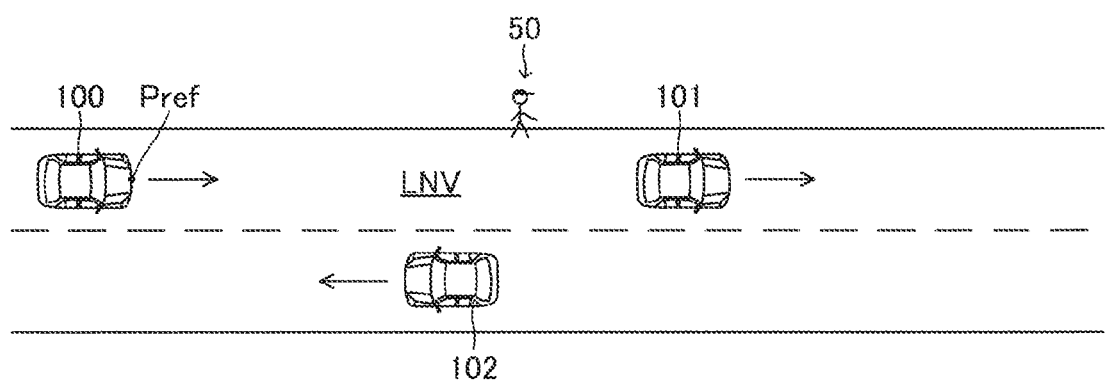
FIG. 2 is a view which is used for describing a forward-moving vehicle.

The ECU 90 determines whether there is a forward-moving vehicle 101, based on the millimeter wave data and the image data. The ECU 90 acquires an inter-vehicle distance D, based on the millimeter wave data and the image data when there is the forward-moving vehicle 101 as shown in FIG. 2. The inter-vehicle distance D is a distance between the forward-moving vehicle 101 and the own vehicle 100. The forward-moving vehicle 101 is another vehicle moving just ahead of the own vehicle 100 in a traffic lane where the own vehicle 100 moves. Hereinafter, the traffic lane where the own vehicle 100 moves, will be referred to as "the moving lane LNV."

Further, the ECU 90 determines whether there is an oncoming vehicle 102, based on the millimeter wave data and the image data. The ECU 90 acquires a relative speed dV102 and a relative position P102, based on the millimeter wave data and the image data when there is the oncoming vehicle 102 as shown in FIG. 2. The relative speed dV102 is a moving speed of the oncoming vehicle 102 relative to the moving speed SPD of the own vehicle 100. The relative position P102 is a position of the oncoming vehicle 102 relative to a reference point Pref of the own vehicle 100. The oncoming vehicle 102 is a vehicle moving in a direction opposite to a direction of the movement of the own vehicle 100 in a traffic lane right next to the moving lane LNV. The oncoming vehicle 102 moves approaching the own vehicle 100. The reference point Pref is a center point of a front end of the own vehicle 100 in a width direction of the own vehicle 100. Hereinafter, the reference point Pref will be referred to as "the own vehicle reference point Pref."

Furthermore, the ECU 90 determines whether there is a standing object 50 ahead of the own vehicle 100, based on the millimeter wave data and the image data. The standing objects 50 are, for example, walking persons and bicycles. When there is the standing object 50 ahead of the own vehicle 100 as shown in FIG. 2, the ECU 90 acquires a relative speed dV50 and a relative position P50, based on the millimeter wave data and the image data. The relative speed dV50 is a moving speed of the standing object 50 relative to the moving speed SPD of the own vehicle 100. The relative position P50 is a position of the standing object 50 relative to the own vehicle reference point Pref.

Figure 3:
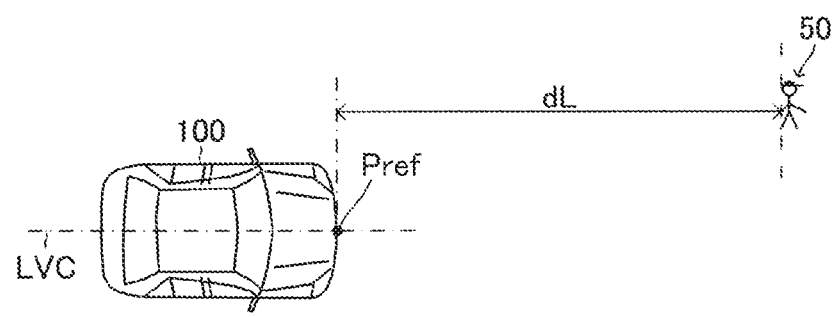
FIG. 3 is a view which is used for describing a longitudinal distance.

Furthermore, the ECU 90 acquires a longitudinal distance dL, based on the relative position P50. As shown in FIG. 3, the longitudinal distance dL is a distance between the own vehicle reference point Pref and the standing object 50 in an extension direction of a line LNC which extends along a center line of the moving lane LNV. Furthermore, the ECU 90 acquires a predicted reaching time TTC. The predicted reaching time TTC corresponds to a value acquired by dividing the longitudinal distance dL by the relative speed dV50 (TTC=dL/dV50).

The driving assist request lever 77 is electrically connected to the ECU 90. The driving assist request lever 77 is operated by the driver of the own vehicle 100. The driving assist request lever 77 sends a high-level signal to the ECU 90 when the driving assist request lever 77 is positioned at an ON position. When the ECU 90 receives the high-level signal, the ECU 90 determines that a following moving control described later is requested to be executed. On the other hand, the driving assist request lever 77 sends a low-level signal to the ECU 90 when the driving assist request lever 77 is positioned at an OFF position. When the ECU 90 receives the low-level signal, the ECU 90 determines that the following moving control is requested to be stopped.

The driver of the own vehicle 100 can set a target inter-vehicle distance Dtgt and a target moving speed SPDtgt by operating the driving assist request lever 77. The target inter-vehicle distance Dtgt is the inter-vehicle distance D to be targeted in the following moving control, and the target moving speed SPDtgt is the moving speed SPD of the own vehicle 100 to be targeted in the following moving control.

<Summary of Operations of Embodiment Control Apparatus>

Next, a summary of operations of the embodiment control apparatus will be described. The embodiment control apparatus is configured to execute a normal moving control, the following moving control, and a steering avoidance control. The embodiment control apparatus determines whether a following moving condition is satisfied, and whether a steering avoidance condition is satisfied in order to determine which of the normal moving control, the following moving control, the steering avoidance control should be executed.

The following moving condition is satisfied when (i) the following moving control is requested to be executed by the driver of the own vehicle 100 operating the driving assist request lever 77, and (ii) the steering avoidance condition is not satisfied. Therefore, the following moving condition is not satisfied when the following moving control is requested to be executed while the steering avoidance condition has been satisfied. Further, the following moving condition becomes unsatisfied when the steering avoidance condition becomes satisfied while the following moving control has been requested to be executed. Furthermore, the following moving condition becomes unsatisfied when the following moving control is requested to be stopped.

The steering avoidance condition is satisfied when (i) at least one standing object 50 exists in a steering avoidance area, and (ii) the predicted reaching time TTC relating to the at least one standing object 50 is shorter than or equal to a predetermined time TTCth. The steering avoidance area is a specified area ahead of the own vehicle 100. Therefore, the steering avoidance condition is not satisfied when no standing objects 50 exist in the steering avoidance area. Also, the steering avoidance condition is not satisfied when the predicted reaching time TTC relating to the standing object 50 is longer than the predicted reaching time TTC.

In this embodiment, the steering avoidance area is set in an area ahead of the own vehicle 100. The own vehicle 100 may not pass safely by the standing object 50 existing in the steering avoidance area, moving on the right side of the standing object 50 if the driver continues to drive the own vehicle 100 in the moving lane LNV. The embodiment control apparatus sets the steering avoidance area, based on the millimeter wave data, the image data, and a shape of the moving lane LNV where the own vehicle 100 now moves.

Figure 4A:
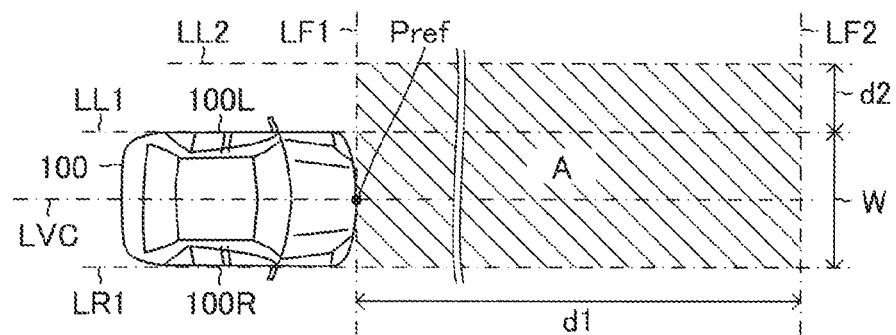
FIG. 4A is a view which is used for describing a steering avoidance area when vehicles are regulated to move on a left side of a road.
Figure 4B:
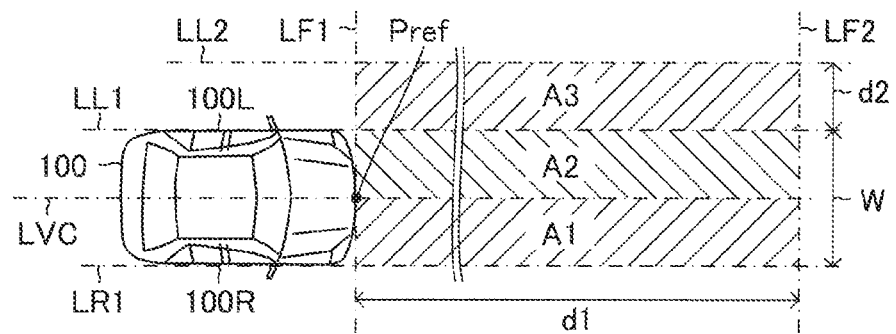
FIG. 4B is a view which is used for describing the steering avoidance area when vehicles are regulated to move on a right side of the road.
Figure 5:
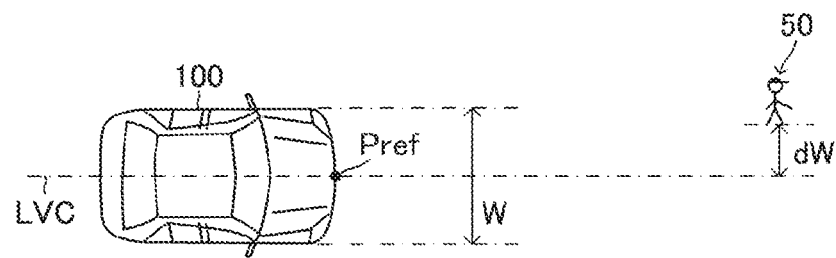
FIG. 5 is a view which is used for describing a lap rate.

For example, when the own vehicle 100 moves on the straight road as shown in FIG. 4A, the embodiment control apparatus sets an area A shown in FIG. 4A as the steering avoidance area, based on the millimeter wave data and the image data. As shown in FIG. 4B, the steering avoidance area A includes areas A1 to A3. The area A1 is a right-half portion of an area ahead of the own vehicle 100. The area A2 is a left-half portion of the area ahead of the own vehicle 100. The area A3 is an area on the left side of the area A2.

The right-half portion (i.e., the area A1) of the area A ahead of the own vehicle 100 is defined by a front end line LF1, a forward line LF2, a vehicle center line LVC, and a right end line LR1. The front end line LF1 is a line which extends through the own vehicle reference point Pref in the width direction of the own vehicle 100. The forward line LF2 is a line which extends parallel to the front end line LF1 ahead of the front end line LF1 by a predetermined distance d1. The right end line LR1 is a line which extends in a longitudinal direction of the own vehicle 100 through a right end 100R of the own vehicle.

The left-half portion (i.e., the area A2) of the area A ahead of the own vehicle 100 is defined by the front end line LF1, the forward line LF2, the vehicle center line LVC, and a left end line LL1. The left end line LL1 is a line which extends in the longitudinal direction of the own vehicle 100 through a left end 100L of the own vehicle 100.

The area A3 on the left side of the area A2 is defined by the front end line LF1, the forward line LF2, the left end line LL1, and a leftward line LL2. The leftward line LL2 is a line which extends parallel to the left end line LL1 leftward of the left end line LL1 by a predetermined distance d2.

The vehicles may be regulated to move on the right side of the road by road traffic rules. In this case, the embodiment control apparatus sets the steering avoidance area where the own vehicle 100 may not pass safely by the standing object 50 in the steering avoidance area, moving on the left side of the standing object 50 if the driver continues to drive the own vehicle 100 in the moving lane LNV.

In this embodiment, the predicted reaching time TTC is previously set to an appropriate constant time. In this regard, the embodiment control apparatus may be configured to set the predicted reaching time TTC which increases as a lap rate LAP increases. The lap rate LAP is, for example, a value acquired by a width W of the own vehicle 100 by a distance dW between the vehicle center line LVC and the standing object 50 (LAP=W/dW). The embodiment control apparatus acquires the lap rate LAP, based on the millimeter wave data and the image data.

1. Normal Moving Control

The embodiment control apparatus executes the normal moving control including (i) a normal acceleration/deceleration process and (ii) a normal steering process described later when (i) the following moving condition is not satisfied, and (ii) the steering avoidance condition is not satisfied.

1-1. Normal Acceleration/Deceleration Process

While the embodiment control apparatus executes the normal acceleration/deceleration process, the embodiment control apparatus acquires a requested torque TQreq, based on the acceleration pedal depression amount AP and the moving speed SPD. The requested torque TQreq is the driving torque TQout to be output from the driving torque generation apparatus 10. The embodiment control apparatus controls the operations of the driving torque generation apparatus 10 to output the driving torque TQout corresponding to the requested torque TQreq from the driving torque generation apparatus 10. When the acceleration pedal depression amount AP is zero, the requested torque TQreq is zero.

Further, while the embodiment control apparatus executes the normal acceleration/deceleration process, the embodiment control apparatus acquires a requested braking force BKreq, based on the brake pedal depression amount BP. The requested braking force BKreq is a braking force BK to be applied to the wheels 100W from the brake apparatus 20. The embodiment control apparatus controls the operations of the brake apparatus 20 to apply the braking force BK corresponding to the requested braking force BKreq to the wheels 100W. When the brake pedal depression amount BP is zero, the requested braking force BKreq is zero.

1-2. Normal Steering Process

While the embodiment control apparatus executes the normal steering process, the embodiment control apparatus controls the operations of the power steering apparatus 30 to control the front wheel steering angle AGst to the requested steering angle AGst_req.

2. Following Moving Control

When the following moving condition is satisfied, the embodiment control apparatus executes the following moving control including (i) a target acceleration setting process, (ii) a following acceleration/deceleration process, and (iii) the normal steering process described above.

2-1. Target Acceleration Setting Process

The embodiment control apparatus executes the target acceleration setting process, based on the inter-vehicle distance D and the moving speed SPD when there is the forward-moving vehicle 101 to be targeted by the following moving control. Hereinafter, the forward-moving vehicle 101 to be targeted by the following moving control, will be simply referred to as "the forward-moving vehicle 101." On the other hand, when the forward-moving vehicle 101 does not exist, the embodiment control apparatus executes the target acceleration setting process, based on the moving speed SPD.

In particular, when (i) the forward-moving vehicle 101 exists, and (ii) the moving speed SPD is smaller than a target moving speed SPDtgt, the embodiment control apparatus sets a target of an acceleration of the own vehicle 100 as a target acceleration Gtgt, based on an inter-vehicle distance difference dD. The inter-vehicle distance difference dD is a difference between the inter-vehicle distance D and the target inter-vehicle distance Dtgt. When the inter-vehicle distance difference dD is smaller than zero, the target acceleration Gtgt is positive, and an absolute value of the target acceleration Gtgt increases as an absolute value of the inter-vehicle distance difference dD increases. On the other hand, when the inter-vehicle distance difference dD is larger than zero, the target acceleration Gtgt is negative, and the absolute value of the target acceleration Gtgt increases as the absolute value of the inter-vehicle distance difference dD increases. When the inter-vehicle distance difference dD is zero, the target acceleration Gtgt is zero.

When (i) the forward-moving vehicle 101 exists, and (ii) the moving speed SPD is larger than the target moving speed SPDtgt, the embodiment control apparatus sets the target acceleration Gtgt, based on a moving speed difference dSPD. The moving speed difference dSPD is a difference between the moving speed SPD of the own vehicle 100 and the target moving speed SPDtgt. In this case, the target acceleration Gtgt is negative, and the absolute value of the target acceleration Gtgt increases as an absolute value of the moving speed difference dSPD increases. When the moving speed difference dSPD is zero, the target acceleration Gtgt is zero.

When (i) the forward-moving vehicle 101 does not exist, and (ii) the moving speed SPD is larger than the target moving speed SPDtgt, the embodiment control apparatus sets the target acceleration Gtgt, based on the moving speed difference dSPD. In this case, the target acceleration Gtgt is negative, and the absolute value of the target acceleration Gtgt increases as the absolute value of the moving speed difference dSPD increases.

When (i) the forward-moving vehicle 101 does not exist, and (ii) the moving speed SPD is smaller than the target moving speed SPDtgt, the embodiment control apparatus acquires a base value of the target acceleration Gtgt as a base acceleration Gbase, based on the moving speed difference dSPD. In this case, the base acceleration Gbase is positive, and an absolute value of the base acceleration Gbase increases as the absolute value of the moving speed difference dSPD increases.

When the acceleration of the own vehicle 100 is smaller than a predetermined threshold Gth, the embodiment control apparatus acquires a corrected acceleration Gad. Hereinafter, the acceleration of the own vehicle 100 will be referred to as "the vehicle acceleration G." The corrected acceleration Gad is positive, and an absolute value of the corrected acceleration Gad increases as a duration time TC increases. The duration time TC is a time when the vehicle acceleration G continues to be smaller than the predetermined threshold Gth.

The embodiment control apparatus acquires a value calculated by adding the corrected acceleration Gad to the base acceleration Gbase and acquires the value as the target acceleration Gtgt (=Gbase+Gad). Therefore, the target acceleration Gtgt gradually increases as the target acceleration Gtgt is positive, but the vehicle acceleration G is smaller than the predetermined threshold Gth.

For example, the own vehicle 100 may not accelerate even when the driving torque TQout increases while the own vehicle 100 moves up a slope. In this case, the moving speed difference dSPD does not decrease and as a result, the driver of the own vehicle 100 may feel discomfort. If the target acceleration Gtgt gradually increases while the vehicle acceleration G is small, the own vehicle 100 accelerates and as a result, the moving speed difference dSPD decreases. Thereby, the driver of the own vehicle 100 may be prevented from feeling discomfort.

When (i) the forward-moving vehicle 101 does not exist, and (ii) the moving speed SPD is equal to the target moving speed SPDtgt, the embodiment control apparatus sets the target acceleration Gtgt to zero.

In this embodiment, when the following moving control is stopped, the target acceleration setting process is also stopped. When the target acceleration setting process is stopped, the target acceleration Gtgt is cleared to zero.

The embodiment control apparatus may be configured to set the target acceleration Gtgt which increases as the duration time TC (i.e., the time when the vehicle acceleration G continues to be smaller than the predetermined threshold Gth) increases when (i) the forward-moving vehicle 101 exists, and (ii) the moving speed SPD is smaller than the target moving speed SPDtgt, similar to when (i) the forward-moving vehicle 101 does not exist, and (ii) the moving speed SPD is smaller than the target moving speed SPDtgt.

Further, the embodiment control apparatus may be configured to set the target acceleration Gtgt such that the deceleration of the own vehicle 100 increases as a time when the deceleration of the own vehicle 100 continues to be smaller than a predetermined threshold, increases when (i) the forward-moving vehicle 101 exists, and (ii) the moving speed SPD is larger than the target moving speed SPDtgt. Furthermore, the embodiment control apparatus may be configured to set the target acceleration Gtgt such that the deceleration of the own vehicle 100 increases as the time when the deceleration of the own vehicle 100 continues to be smaller than the predetermined threshold, increases when (i) the forward-moving vehicle 101 does not exist, and (ii) the moving speed SPD is larger than the target moving speed SPDtgt.

2-2. Following Acceleration/Deceleration Process

While the embodiment control apparatus executes the following acceleration/deceleration process, the embodiment control apparatus acquires the target torque TQtgt, based on the target acceleration Gtgt and the moving speed SPD. In this case, the acquired target torque TQtgt corresponds to the driving torque TQout which controls the vehicle acceleration G to the target acceleration Gtgt. The embodiment control apparatus controls the operations of the driving torque generation apparatus 10 to output the driving torque TQout corresponding to the target torque TQtgt from the driving torque generation apparatus 10. In this case, when the target acceleration Gtgt is larger than zero, the driving torque TQout is increased. On the other hand, when the target acceleration Gtgt is smaller than zero, the driving torque TQout is decreased. When the target acceleration Gtgt is zero, the embodiment control apparatus controls the operations of the driving torque generation apparatus 10 to maintain the current driving torque TQout.

The embodiment control apparatus may be configured to decrease the driving torque TQout by the following acceleration/deceleration process by decreasing the current driving torque TQout by a predetermined value dTQ. Alternatively, the embodiment control apparatus may be configured to decrease the driving torque TQout by the following acceleration/deceleration process by decreasing the current driving torque TQout to a predetermined torque TQth. Alternatively, the embodiment control apparatus may be configured to decrease the driving torque TQout by the following acceleration/deceleration process by decreasing the current driving torque TQout to zero.

Further, the embodiment control apparatus may be configured to execute the following acceleration/deceleration process to apply a predetermined braking force BKacc to the wheels 100W in addition to decreasing the driving torque TQout.

3. Steering Avoidance Control

When the steering avoidance condition is satisfied, the embodiment control apparatus executes the steering avoidance control including (i) an avoidance steering process and (ii) a deceleration process and cancels a request of executing the following moving control by the driving assist request lever 77.

3-1. Avoidance Steering Process

The avoidance steering process is a process to control the operations of the power steering apparatus 30 to control the front wheel steering angle AGst to cause the own vehicle 100 to (i) pass safely by the standing object 50 on the right side of the standing object 50 and then (ii) return the own vehicle 100 safely to the original moving lane LNV. The original moving lane LNV is the moving lane where the own vehicle 100 moved when the avoidance steering process is started.

Figure 6A:
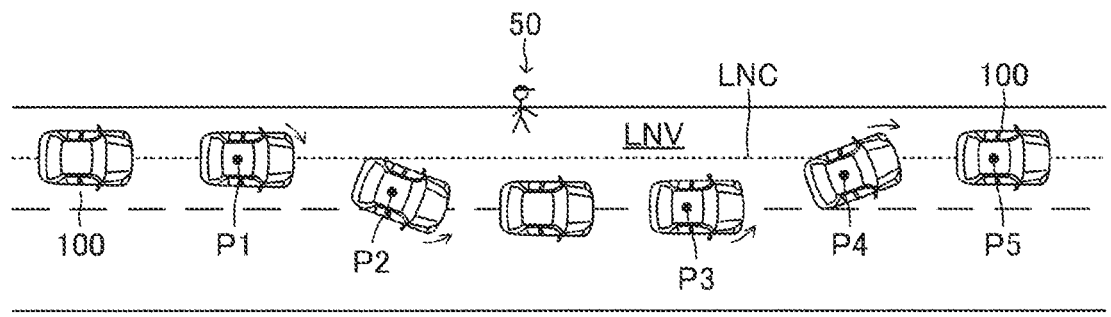
FIG. 6A is a view which is used for describing a movement of an own vehicle when (i) the own vehicle moves on a straight road, and (ii) a steering avoidance control is executed.

For example, when (i) the own vehicle 100 moves on the straight road, and (ii) the avoidance steering process is executed, the own vehicle 100 is steered by the power steering apparatus 30 to move as shown in FIG. 6A.

In an example shown in FIG. 6A, when the own vehicle 100 reaches a first point P1, the steering avoidance condition becomes satisfied, and the avoidance steering process is started. Thereby, the front wheel steering angle AGst is controlled to cause the own vehicle 100 to turn rightward. Then, the own vehicle 100 reaches a second point P2. When the own vehicle 100 reaches the second point P2, the front wheel steering angle AGst starts to be controlled to cause the own vehicle 100 to move straight in an extension direction of the original moving lane LNV. The original moving lane LNV is the traffic lane where the own vehicle 100 moved before the avoidance steering process was started. The second point P2 is a point where the own vehicle 100 can pass by the standing object 50 on the right side of the standing object 50 without contacting to the standing object 50 even when the front wheel steering angle AGst starts to be controlled to move the own vehicle 100 in the extension direction of the original moving lane LNV.

After the own vehicle 100 passes by the standing object 50 on the right side of the standing object 50, the own vehicle 100 reaches a third point P3. When the own vehicle 100 reaches the third point P3, the front wheel steering angle AGst starts to be controlled to return the own vehicle 100 to the original moving lane LNV. Thereby, the front wheel steering angle AGst starts to be controlled to cause the own vehicle 100 to turn leftward. The third point P3 is a point where the own vehicle 100 does not contact to the standing object 50 even when the front wheel steering angle AGst starts to be controlled to return the own vehicle 100 to the original moving lane LNV.

Then, the own vehicle 100 reaches a fourth point P4. When the own vehicle 100 reaches the fourth point P4, the front wheel steering angle AGst starts to be controlled to cause the own vehicle 100 to move straight in the extension direction of the original moving lane LNV. The fourth point P4 is a point just before the center line LNC of the original moving lane LNV.

After the own vehicle 100 reaches a fifth point P5 and starts to move along the original moving lane LNV, the steering avoidance condition becomes unsatisfied, and the avoidance steering process is stopped.

Figure 6B:
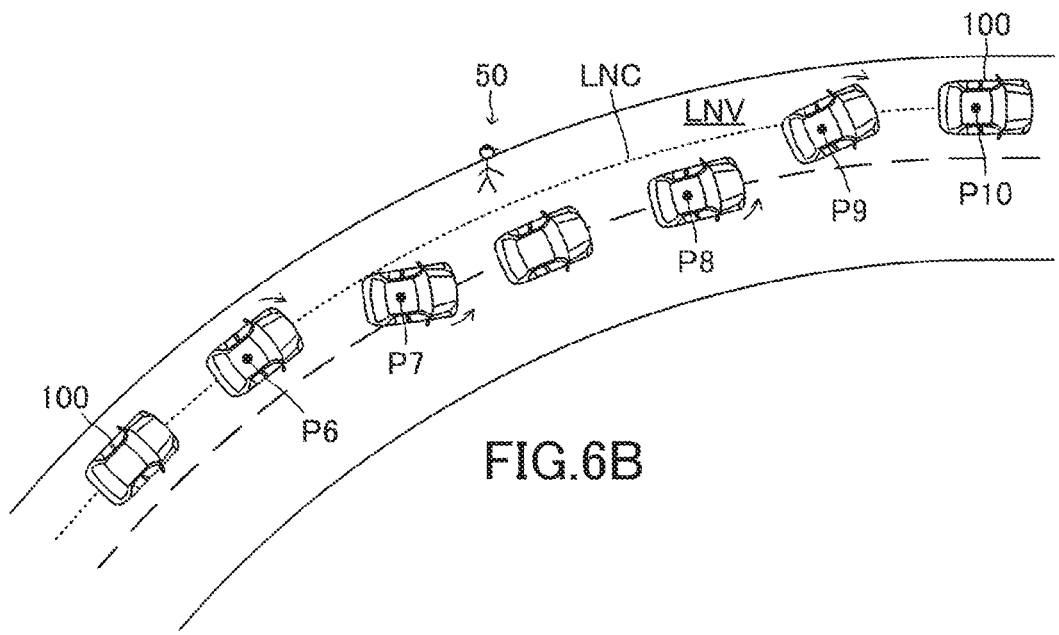
FIG. 6B is a view which is used for describing the movement of the own vehicle when (i) the own vehicle moves on a curved road, and (ii) the steering avoidance control is executed.

For example, when (i) the own vehicle 100 moves on a rightward-curved road, and (ii) the avoidance steering process is executed, the own vehicle 100 is steered by the power steering apparatus 30 to cause the own vehicle 100 to move as shown in FIG. 6B.

In an example shown in FIG. 6B, when the own vehicle 100 reaches a sixth point P6, the steering avoidance condition becomes satisfied, and the avoidance steering process is started. Thereby, the front wheel steering angle AGst starts to be controlled to cause the own vehicle 100 to turn more rightward. Then, the own vehicle 100 reaches a seventh point P7. When the own vehicle 100 reaches the seventh point P7, the front wheel steering angle AGst starts to be controlled to move the own vehicle 100 in the extension direction of the original moving lane LNV. That is, the front wheel steering angle AGst starts to be controlled to cause the own vehicle 100 to move, turning rightward. The seventh point P7 is a point where the own vehicle 100 can pass by the standing object 50 on the right side of the standing object 50 without contacting to the standing object 50 even when the front wheel steering angle AGst is controlled to move the own vehicle 100 in the extension direction of the original moving lane LNV.

After the own vehicle 100 passes by the standing object 50 on the right side of the standing object 50 and reaches an eighth point P8, the front wheel steering angle AGst starts to be controlled to return the own vehicle 100 to the original moving lane LNV. That is, the front wheel steering angle AGst starts to be controlled to cause the own vehicle 100 to turn leftward, move straight, or turn more rightward, depending on a curvature of the curved road. The eighth point P8 is a point where the own vehicle 100 does not contact to the standing object 50 even when the front wheel steering angle AGst starts to be controlled to return the own vehicle 100 to the original moving lane LNV.

Then, the own vehicle 100 reaches a ninth point P9. When the own vehicle 100 reaches the ninth point P9, the front wheel steering angle AGst starts to be controlled to cause the own vehicle 100 to move along the original moving lane LNV. That is, the front wheel steering angle AGst starts to be controlled to cause the own vehicle 100 to move, turning rightward. The ninth point P9 is a point just before the center line LNC of the original moving lane LNV.

Then, the own vehicle 100 reaches a tenth point P10. When the own vehicle 100 reaches the tenth point P10 and starts to move along the original moving lane LNV, the steering avoidance condition becomes unsatisfied, and the avoidance steering process is stopped.

The embodiment control apparatus may be configured to stop the avoidance steering process when a predetermined time elapses after the own vehicle 100 starts to move along the original moving lane LNV. In the example shown in FIG. 6A, the embodiment control apparatus may stop the avoidance steering process when the predetermined time elapses after the own vehicle 100 reaches the fifth point P5, and the own vehicle 100 starts to move along the original moving lane LNV. In the example shown in FIG. 6B, the embodiment control apparatus may stop the avoidance steering process when the predetermined time elapses after the own vehicle 100 reaches the tenth point P10, and the own vehicle 100 starts to move along the original moving lane LNV.

3-2. Deceleration Process

The deceleration process is a process to control the operations of the driving torque generation apparatus 10 to set the target torque TQtgt to zero even when the acceleration pedal depression amount AP is larger than zero. Thereby, the driving torque TQout output from the driving torque generation apparatus 10 is controlled to zero. Therefore, when the deceleration process is executed, the driving torque TQout becomes zero, and the own vehicle 100 decelerates.

The embodiment control apparatus may be configured to execute the avoidance steering process to control the operations of the power steering apparatus 30 to control the front wheel steering angle AGst to cause the own vehicle 100 to pass by the standing object 50 on a left side of the standing object 50 when the embodiment control apparatus determines that the own vehicle 100 passes by the standing object 50 more safely by causing the own vehicle 100 to pass by the standing object 50 on the left side of the standing object 50 than by causing the own vehicle 100 to pass by the standing object 50 on the right side of the standing object 50. The embodiment control apparatus may determine whether it is safe to cause the own vehicle 100 to pass by the standing object 50 on the left side of the standing object 50, based on the relative position P50 and situations surrounding the moving lane LNV. The situations surrounding the moving lane LNV may include (i) whether oncoming vehicles exist or not, (ii) whether vehicles moving by the own vehicle 100 in the same direction as the moving direction of the own vehicle 100, and (iii) situations of traffic lanes next to the moving lane LNV.

The embodiment control apparatus may be configured to execute another deceleration process to control the operations of the driving torque generation apparatus 10 and the brake apparatus 20 to control the driving torque TQout to zero and apply the braking forces BK having predetermined values to the wheels 100W, respectively.

Alternatively, the embodiment control apparatus may be configured to execute the deceleration process when (i) the steering avoidance condition is satisfied, and (ii) the moving speed SPD is larger than or equal to a predetermined moving speed SPDth. The predetermined moving speed SPDth is set to the moving speed SPD which can cause the own vehicle 100 to safely pass by the standing object 50 on the right side of the standing object 50. In this case, the embodiment control apparatus executes the normal acceleration/deceleration process when (i) the steering avoidance condition is satisfied, and (ii) the moving speed SPD is smaller than the predetermined moving speed SPDth.

Alternatively, the embodiment control apparatus may be configured to execute the normal acceleration/deceleration process in place of the deceleration process.

As described above, the following moving control is stopped when the steering avoidance condition becomes satisfied as the following moving control is executed. Therefore, the following acceleration/deceleration process and the target acceleration setting process are also stopped.

In this regard, the own vehicle 100 is not accelerated or decelerated by the following moving control as the steering avoidance control is executed when the following acceleration/deceleration process is stopped without stopping the target acceleration setting process in response to the steering avoidance condition becoming satisfied as the following moving control is executed. In this case, the following acceleration/deceleration process is restarted after the steering avoidance control is finished. However, this may lead to some problems described below.

When the steering avoidance control is started to turn the own vehicle 100 rightward, the forward-moving vehicle 101 does not exist temporarily ahead of the own vehicle 100. As a result, the own vehicle 100 may not be detected by the radar sensor 75 and the camera apparatus 76. When (i) the own vehicle 100 is not detected by the radar sensor 75 and the camera apparatus 76, (ii) the target acceleration setting process is executed, and (iii) the moving speed SPD is smaller than the target moving speed SPDtgt, the target acceleration Gtgt which accelerates the own vehicle 100 is set. When the steering avoidance control is executed, the following acceleration/deceleration process is stopped. Thus, even when the target acceleration Gtgt which accelerates the own vehicle 100 is set, the moving speed SPD does not increase. Indeed, the moving speed SPD decreases since the deceleration process of the steering avoidance control is executed. Thus, the acceleration G of the own vehicle 100 is smaller than the predetermined threshold Gth even when the target acceleration Gtgt which accelerates the own vehicle 100 is set. Therefore, the target acceleration Gtgt increases continuously as the steering avoidance control is executed.

Thereby, the target acceleration Gtgt has been set to an extremely large value when the steering avoidance control is finished. When the steering avoidance control is finished, the following acceleration/deceleration process is restarted. Then, the driving torque TQout is controlled to control the vehicle acceleration G to the target acceleration Gtgt. Thereby, the driving torque TQout increases largely. As a result, the own vehicle 100 accelerates considerably.

According to the embodiment control apparatus, a request of executing the following moving control by the driving assist request lever 77 is canceled when the steering avoidance condition becomes satisfied as the following moving control is executed. In addition, the following moving condition is satisfied when the steering avoidance condition becomes unsatisfied. Therefore, when the steering avoidance condition becomes satisfied, the following moving condition becomes unsatisfied. As a result, the following moving control is stopped.

Further, as the steering avoidance control is executed after the following moving control is stopped, the steering avoidance condition is kept satisfied. Thus, the embodiment control apparatus does not execute the following moving control even when the driving assist request lever 77 is operated again to request to execute the following moving control.

Furthermore, the embodiment control apparatus cancels the request of executing the following moving control when the embodiment control apparatus starts the steering avoidance control. Thus, the embodiment control apparatus does not execute the following moving control until the embodiment control apparatus stops the steering avoidance control, and the following moving control is requested to be executed by the driving assist request lever 77 being operated.

As described above, the following moving control is not executed after the steering avoidance control is stopped. Thus, the own vehicle 100 can be prevented from accelerating considerably.

Modified Example

The embodiment control apparatus may be configured to execute the target acceleration setting process when a condition of executing the target acceleration setting process is satisfied. In this case, the embodiment control apparatus may be configured to execute the following acceleration/deceleration process when a condition of executing the following acceleration/deceleration process is satisfied. Hereinafter, the condition of executing the target acceleration setting process will be referred to as "the target acceleration setting condition." In addition, the condition of executing the following acceleration/deceleration process will be referred to as "the following acceleration/deceleration condition." In addition, the vehicle moving control apparatus configured as such will be referred to as "the modified control apparatus."

In the modified control apparatus, the target acceleration setting condition becomes satisfied when the following moving control is requested to be executed. On the other hand, the target acceleration setting condition becomes unsatisfied when the request of executing the following moving control is cancelled.

The following acceleration/deceleration condition is satisfied when (i) the following moving control is requested to be executed, and (ii) the steering avoidance condition is not satisfied. Therefore, the following acceleration/deceleration condition is not satisfied when (i) the following moving control is requested to be executed, and (ii) the steering avoidance condition is satisfied. In addition, the following acceleration/deceleration condition becomes unsatisfied when the steering avoidance condition becomes satisfied as the following moving control is requested to be executed. In addition, the following acceleration/deceleration condition becomes unsatisfied when the request of executing the following moving control is cancelled.

The modified control apparatus executes the target acceleration setting process to set the target acceleration Gtgt to zero or limit the target acceleration Gtgt to an upper limit acceleration Glimit when (i) the target acceleration setting condition becomes satisfied, and (ii) the following acceleration/deceleration condition becomes unsatisfied. The upper limit acceleration Glimit is set to a value larger than zero. For example, the upper limit acceleration Glimit is set to a value expected not to provide the driver of the own vehicle 100 with discomfort feeling even when (i) the steering avoidance control is finished, (ii) the following acceleration/deceleration process is restarted, and (iii) the vehicle acceleration G is set to the upper limit acceleration Glimit.

Thereby, the following acceleration/deceleration process is restarted when the steering avoidance control is finished.

Thus, the driver does not have to operate the driving assist request lever 77 to restart the following moving control when the steering avoidance control is finished. In addition, the target acceleration Gtgt is not set to the excessive large value when the following acceleration/deceleration process is restarted. Thus, the own vehicle 100 can be prevented from accelerating considerably when the following acceleration/deceleration process is restarted.

As described above, according to the embodiment control apparatus and the modified control apparatus, the following moving control is stopped when the steering avoidance condition becomes satisfied as the following moving control is executed. Thus, the target acceleration Gtgt has not been set when the steering avoidance control is finished. Alternatively, according to the embodiment control apparatus and the modified control apparatus, the target acceleration Gtgt is set to zero when the steering avoidance condition becomes satisfied as the following moving control is executed. Thus, the target acceleration Gtgt has been set to zero when the steering avoidance control is finished. Alternatively, according to the embodiment control apparatus and the modified control apparatus, the target acceleration Gtgt is limited to a value smaller than or equal to the upper limit acceleration Glimit as the steering avoidance condition is satisfied as the following moving control is executed. Thus, the target acceleration Gtgt has been set to the value smaller than or equal to the upper limit acceleration Glimit when the steering avoidance control is finished. Therefore, according to the present disclosure, the target acceleration Gtgt is set to a value smaller than or equal to the predetermined acceleration Gmax when the steering avoidance control is finished after the steering avoidance condition becomes satisfied as the following moving control is executed. It should be noted that the upper limit acceleration Glimit is set to a value smaller than or equal to the predetermined acceleration Gmax.

<Particular Operations of Embodiment Control Apparatus>

Next, particular operations of the embodiment control apparatus will be described. The CPU of the ECU 90 of the embodiment control apparatus is configured or programmed to execute a routine shown in FIG. 7 each time a predetermined time elapses. At a predetermined timing, the CPU starts a process from a step 700 and proceeds with the process to a step 710 to determine whether a value of a steering avoidance flag X1 is "1". The value of the steering avoidance flag X1 is set to "1" when the steering avoidance condition becomes satisfied. The value of the steering avoidance flag X1 is set to "0" when the steering avoidance condition becomes unsatisfied.

When the CPU determines "Yes" at the step 710, the CPU proceeds with the process to a step 720 to execute the steering avoidance control. Then, the CPU proceeds with the process to a step 795 to terminate this routine once.

On the other hand, when the CPU determines "No" at the step 710, the CPU proceeds with the process to a step 730 to determine whether a value of a following moving request flag X2 is "1".

Figure 8:
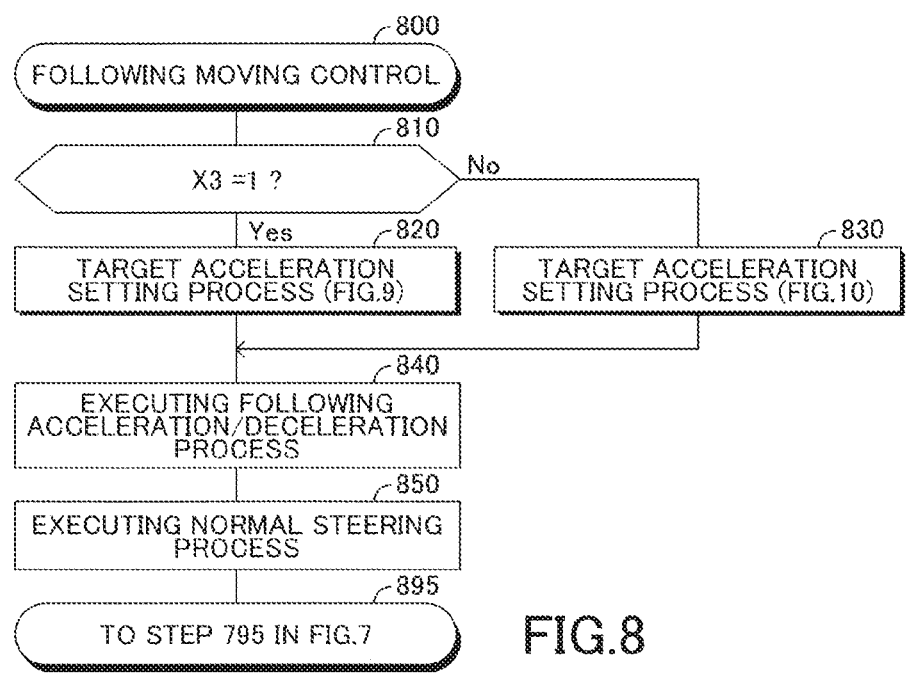
FIG. 8 is a view which shows a flowchart of a routine executed by the CPU.

When the CPU determines "Yes" at the step 730, the CPU proceeds with the process to a step 740 to execute a routine shown in FIG. 8. When the CPU proceeds with the process to the step 740, the CPU starts a process from a step 800 of the routine shown in FIG. 8 and proceeds with the process to a step 810 to determine whether a value of a forward-moving vehicle flag X3 is "1". The value of the forward-moving vehicle flag X3 is set to "1" when the forward-moving vehicle 101 exists. The value of the forward-moving vehicle flag X3 is set to "0" when the forward-moving vehicle 101 does not exist.

Figure 9:
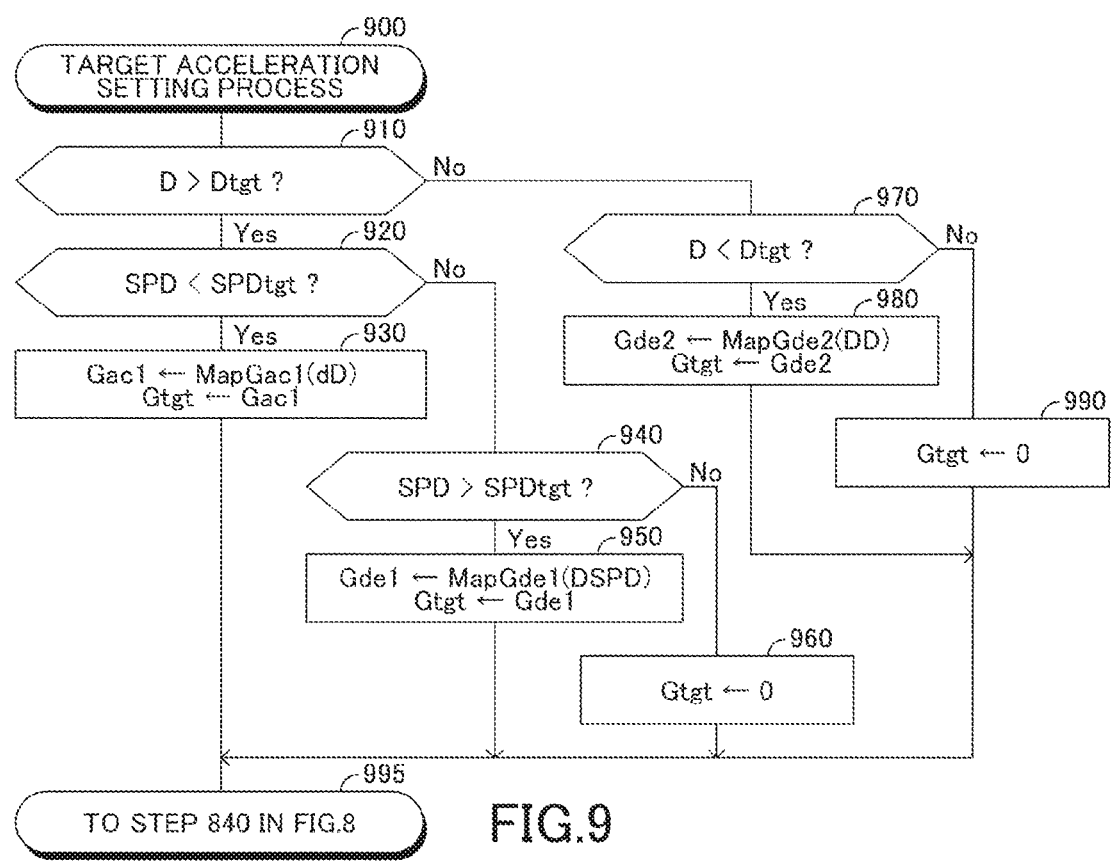
FIG. 9 is a view which shows a flowchart of a routine executed by the CPU.

When the CPU determines "Yes" at the step 810, the CPU proceeds with the process to a step 820 to execute a routine shown in FIG. 9. When the CPU proceeds with the process to the step 820, the CPU starts a process from a step 900 of the routing shown in FIG. 9 and proceeds with the process to a step 910 to determine whether the inter-vehicle distance D is longer than the target inter-vehicle distance Dtgt. When the CPU determines "Yes" at the step 910, the CPU proceeds with the process to a step 920 to determine whether the moving speed SPD is smaller than the target moving speed SPDtgt.

When the CPU determines "Yes" at the step 920, the CPU proceeds with the process to a step 930 to acquire the requested acceleration Gac1 by applying the inter-vehicle distance difference dD to a look-up table MapGac1(dD) and set the acquired requested acceleration Gac1 as the target acceleration Gtgt. The requested acceleration Gac1 acquired in this process is positive. Then, the CPU proceeds with the process to a step 840 of the routine shown in FIG. 8 via a step 995.

On the other hand, when the CPU determines "No" at the step 920, the CPU proceeds with the process to a step 940 to determine whether the moving speed SPD is larger than the target moving speed SPDtgt. When the CPU determines "Yes" at the step 940, the CPU proceeds with the process to a step 950 to acquire the requested acceleration Gde1 by applying the moving speed difference dSPD to a look-up table MapGde1(dSPD) and set the acquired requested acceleration Gde1 as the target acceleration Gtgt. The requested acceleration Gde1 acquired in this process is negative. Then, the CPU proceeds with the process to the step 840 of the routine shown in FIG. 8 via the step 995.

On the other hand, when the CPU determines "No" at the step 940, the CPU proceeds with the process to a step 960 to set the target acceleration Gtgt to zero. Then, the CPU proceeds with the process to the step 840 of the routine shown in FIG. 8 via the step 995.

When the CPU determines "No" at the step 910, the CPU proceeds with the process to a step 970 to determine whether the inter-vehicle distance D is shorter than the target inter-vehicle distance Dtgt. When the CPU determines "Yes" at the step 970, the CPU proceeds with the process to a step 980 to acquire the requested acceleration Gde2 by applying the inter-vehicle distance difference dD to a look-up table MapGde2(dD) and set the acquired requested acceleration Gde2 as the target acceleration Gtgt. The requested acceleration Gde2 acquired in this process is negative. Then, the CPU proceeds with the process to the step 840 of the routine shown in FIG. 8 via the step 995.

On the other hand, when the CPU determines "No" at the step 970, the CPU proceeds with the process to a step 990 to set the target acceleration Gtgt to zero. Then, the CPU proceeds with the process to the step 840 of the routine shown in FIG. 8 via the step 995.

Figure 10:
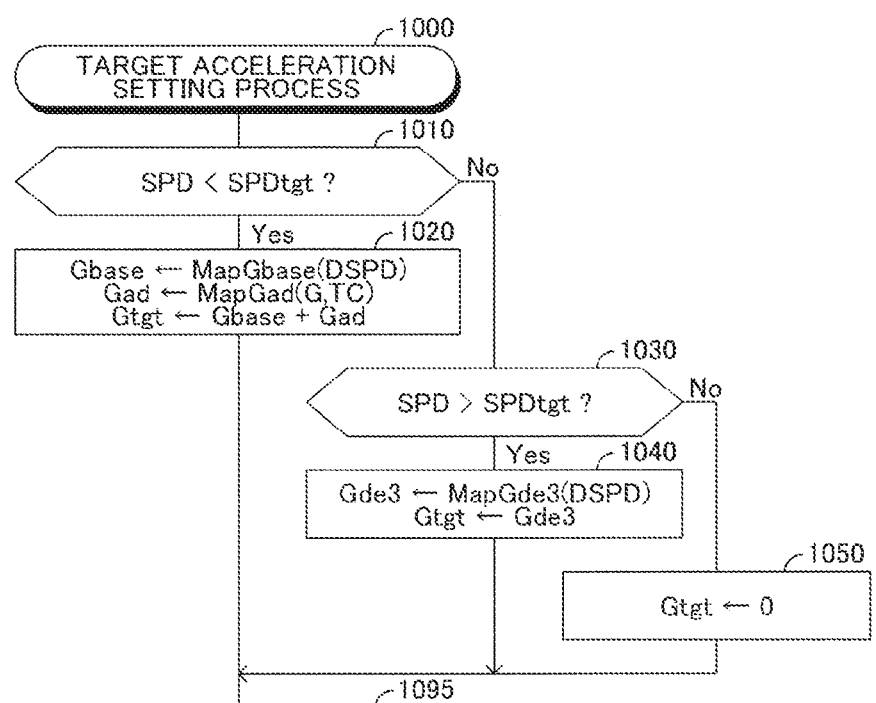
FIG. 10 is a view which shows a flowchart of a routine executed by the CPU.

When the CPU determines "No" at the step 810, the CPU proceeds with the process to a step 830 to execute a routine shown in FIG. 10. When the CPU proceeds with the process to the step 830, the CPU starts a process from a step 1000 and proceeds with the process to a step 1010 to determine whether the moving speed SPD is smaller than the target moving speed SPDtgt.

When the CPU determines "Yes" at the step 1010, the CPU proceeds with the process to a step 1020 to acquire the base acceleration Gbase by applying the moving speed difference dSPD to a look-up table MapGbase(dSPD) and acquire the corrected acceleration Gad by applying the vehicle acceleration G and the duration time TC to a look-up table MapGad(G,TC). Then, the CPU sets the target acceleration Gtgt to a value acquired by adding the corrected acceleration Gad to the base acceleration Gbase. The base acceleration Gbase acquired in this process is positive. Then, the CPU proceeds with the process to the step 840 of the routine shown in FIG. 8 via a step 1095.

On the other hand, when the CPU determines "No" at the step 1010, the CPU proceeds with the process to a step 1030 to determine whether the moving speed SPD is larger than the target moving speed SPDtgt. When the CPU determines "Yes" at the step 1030, the CPU proceeds with the process to a step 1040 to acquire the requested acceleration Gde3 by applying the moving speed difference dSPD to a look-up table MapGde3(dSPD) and sets the acquired requested acceleration Gde3 as the target acceleration Gtgt. The requested acceleration Gde3 acquired in this process is negative. Then, the CPU proceeds with the process to the step 840 of the routine shown in FIG. 8 via the step 1095.

On the other hand, when the CPU determines "No" at the step 1030, the CPU proceeds with the process to a step 1050 to set the target acceleration Gtgt to zero. Then, the CPU proceeds with the process to the step 840 of the routine shown in FIG. 8 via the step 1095.

When the CPU proceeds with the process to the step 840 of the routine shown in FIG. 8, the CPU executes the following acceleration/deceleration process. Next, the CPU proceeds with the process to a step 850 to execute the normal steering process. Then, the CPU proceeds with the process to the step 795 of the routine shown in FIG. 7 via a step 895 to terminate this routine once.

Figure 7:
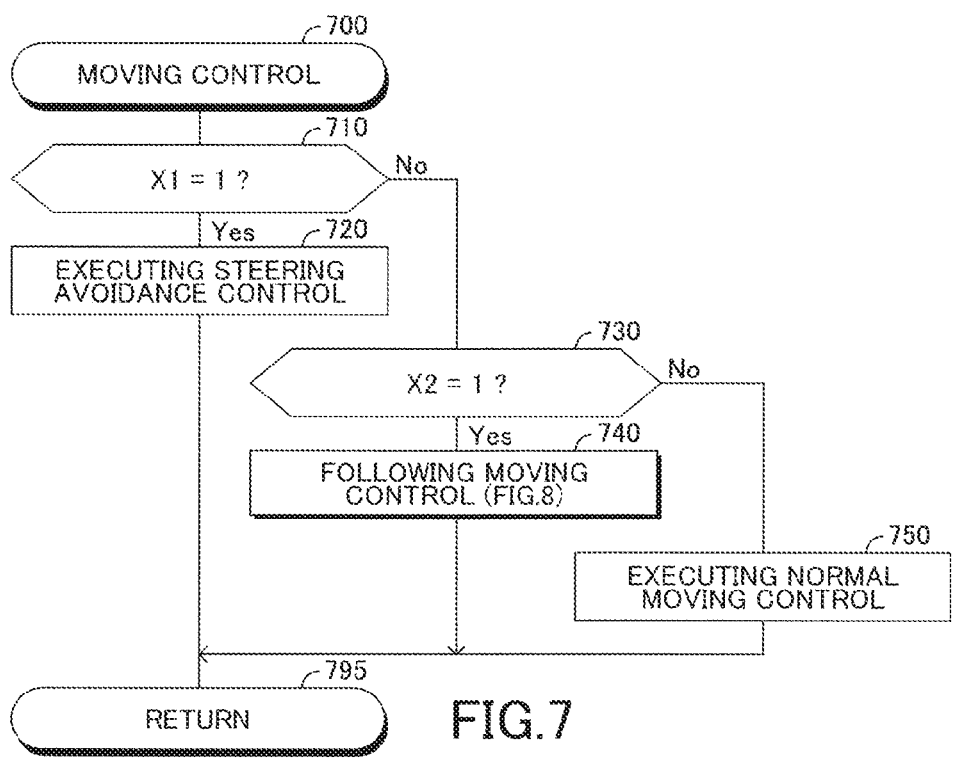
FIG. 7 is a view which shows a flowchart of a routine executed by a CPU of an ECU shown in FIG. 1.

When the CPU determines "No" at the step 730 of the routine shown in FIG. 7, the CPU proceeds with the process to a step 750 to execute the normal moving control. Then, the CPU proceeds with the process to the step 795 to terminate this routine once.

The particular operations of the embodiment control apparatus have been described.

It should be noted that the present disclosure is not limited to the aforementioned embodiment and various modifications can be employed within the scope of the present disclosure.

For example, the embodiment control apparatus may be configured to be requested to execute an adaptive following moving control by the driver of the own vehicle 100 operating the driving assist request lever 77. The adaptive following moving control is one of controls to cause the own vehicle 100 to move automatically, following the forward-moving vehicle 101, based on information on the acceleration and steering of the forward-moving vehicle 101. In this case, the information on the acceleration and the steering of the forward-moving vehicle 101 is transmitted from the forward-moving vehicle 101 to the outside, and the ECU 90 acquires the information on the acceleration and steering of the forward-moving vehicle 101 by wireless communication with the forward-moving vehicle 101.

Further, the radar sensor 75 may be configured to send and receive optical waves such as laser or ultrasonic waves in place of the millimeter waves.

What is claimed is:

1. A vehicle moving control apparatus, comprising:
an information acquisition apparatus which acquires information on situations ahead of an own vehicle as forward situation information; and
an electronic control unit which controls an acceleration of the own vehicle, a deceleration of the own vehicle, and a steering of the own vehicle,
the electronic control unit being configured to:
when (i) a following moving control is requested to be executed, and (ii) the electronic control unit determines that another vehicle exists ahead of the own vehicle, based on the forward situation information, execute (i) a first target acceleration setting process of the following moving control to set a first target acceleration of the own vehicle necessary to maintain an inter-vehicle distance between the own vehicle and the other vehicle at a target distance and (ii) a first following acceleration/deceleration process of the following moving control to control a driving torque to be applied to the own vehicle to accelerate or decelerate the own vehicle to control an acceleration of the own vehicle to the first target acceleration;
when (i) the following moving control is requested to be executed, and (ii) the electronic control unit determines that the other vehicle does not exist ahead of the own vehicle, based on the forward situation information, execute (i) a second target acceleration setting process of the following moving control to set a second target acceleration of the own vehicle based on a moving speed of the own vehicle and a target moving speed, and (ii) a second following acceleration/deceleration process of the following moving control to control the driving torque to accelerate or decelerate the own vehicle to control the acceleration of the own vehicle to the second target acceleration;
when (i) the electronic control unit executes the second following acceleration/deceleration process to control the acceleration of the own vehicle to the second target acceleration larger than zero, and (ii) the acceleration of the own vehicle is smaller than a predetermined threshold, increase the second target acceleration; and
when the electronic control unit determines that a standing object to which the own vehicle potentially contacts, exists ahead of the own vehicle, based on the forward situation information, execute a steering avoidance control to steer the own vehicle to cause the own vehicle to pass by the standing object, avoiding the own vehicle from contacting to the standing object,
wherein the electronic control unit is configured to:
stop the second following acceleration/deceleration process when the electronic control unit starts to execute the steering avoidance control while the electronic control unit is executing the second following acceleration/deceleration process; and
limit the second target acceleration such that the second target acceleration is smaller than or equal to a predetermined acceleration when the electronic control unit finishes executing the steering avoidance control.

2. The vehicle moving control apparatus as set forth in claim 1, wherein the electronic control unit is further configured to stop executing the following moving control when the electronic control unit starts to execute the steering avoidance control.

3. The vehicle moving control apparatus as set forth in claim 2, wherein the electronic control unit is further configured not to execute the following moving control even when the following moving control is requested to be executed as the electronic control unit executes the steering avoidance control.

4. The vehicle moving control apparatus as set forth in claim 1, wherein the electronic control unit is further configured to stop executing the second target acceleration setting process and set the second target acceleration to zero when the electronic control unit starts to execute the steering avoidance control.

5. The vehicle moving control apparatus as set forth in claim 4, wherein the electronic control unit is further configured to restart to execute the second following acceleration/deceleration process and the second target acceleration setting process when the electronic control unit finishes executing the steering avoidance control after the electronic control unit stops executing the second following acceleration/deceleration process and the second target acceleration setting process in response to starting to execute the steering avoidance control.

6. The vehicle moving control apparatus as set forth in claim 1, wherein the electronic control unit is further configured to limit the second target acceleration to an upper limit acceleration when the second target acceleration set by the second target acceleration setting process is larger than the upper limit acceleration as the electronic control unit executes the steering avoidance control after the electronic control unit stops executing the second following acceleration/deceleration process in response to starting to execute the steering avoidance control, the upper limit acceleration being smaller than or equal to the predetermined acceleration and larger than zero.

7. The vehicle moving control apparatus as set forth in claim 6, wherein the electronic control unit is further configured to restart to execute the second following acceleration/deceleration process when the electronic control unit finishes executing the steering avoidance control after the electronic control unit stops executing the second following acceleration/deceleration process in response to starting to execute the steering avoidance control.

8. The vehicle moving control apparatus as set forth in claim 1, wherein the electronic control unit is further configured to increase the second target acceleration as the acceleration of the own vehicle is smaller than the predetermined threshold when (i) the electronic control unit executes the second following acceleration/deceleration process to control the acceleration of the own vehicle to the second target acceleration larger than zero, and (ii) the acceleration of the own vehicle is smaller than the predetermined threshold.

9. The vehicle moving control apparatus as set forth in claim 1, wherein the electronic control unit is further configured to set the first target acceleration, based on a difference between the inter-vehicle distance and the target distance.

10. The vehicle moving control apparatus as set forth in claim 1, wherein the electronic control unit is further configured to set the second target acceleration, based on a difference between the moving speed of the own vehicle and the target moving speed.

11. The vehicle moving control apparatus as set forth in claim 1, wherein the information acquisition apparatus includes at least one of a radar sensor and a camera apparatus.

12. The vehicle moving control apparatus as set forth in claim 1, wherein the electronic control unit is further configured to control operations of a driving torque generation apparatus to control the acceleration of the own vehicle and the deceleration of the own vehicle.

13. The vehicle moving control apparatus as set forth in claim 1, wherein the electronic control unit is further configured to control operations of a steering apparatus to control the steering of the own vehicle.

\* \* \* \* \*